Nov. 2, 1965 J. H. CUNNINGHAM 3,214,839
GAUGE FOR MEASURING ALIGNMENT OR MISALIGNMENT
AND AXIALLY SPACING OF SHAFTS
Filed Nov. 8, 1960
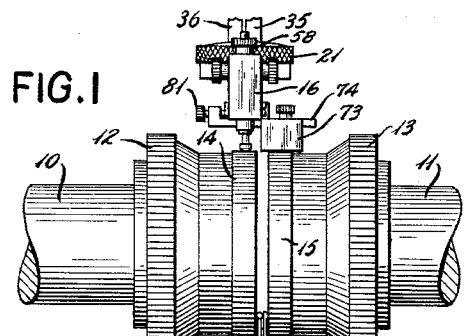
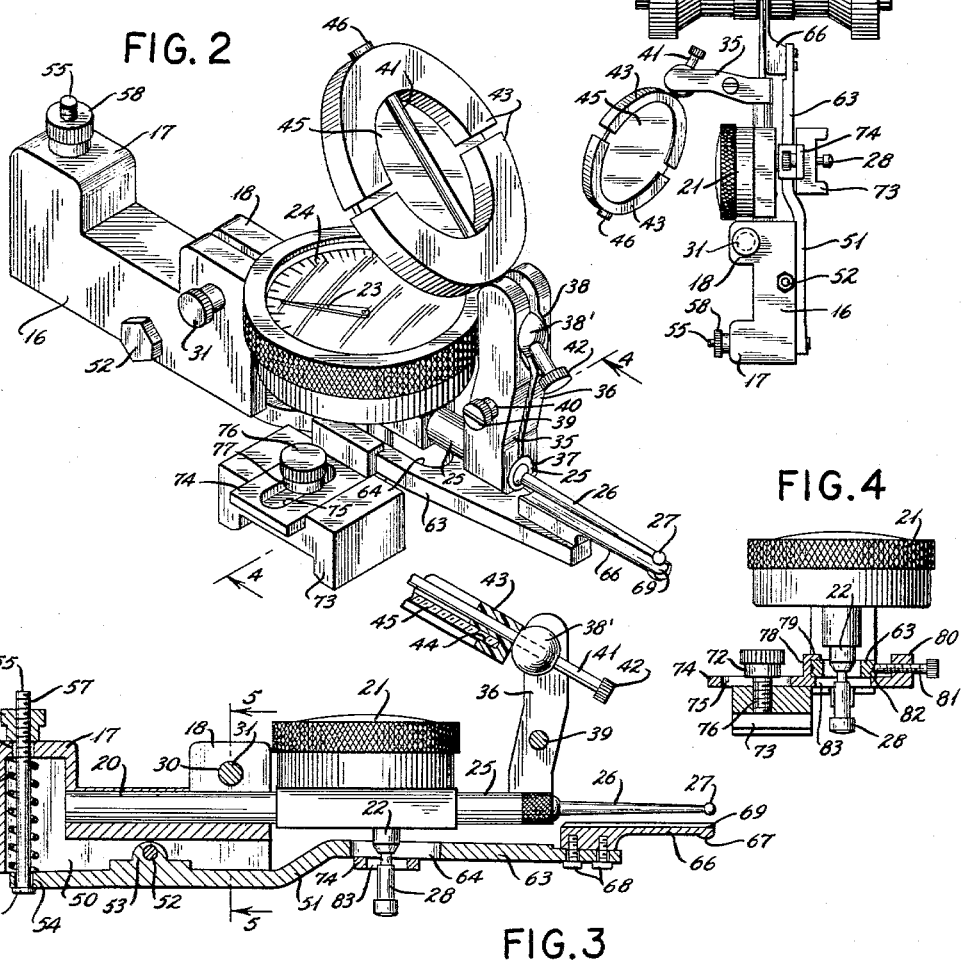
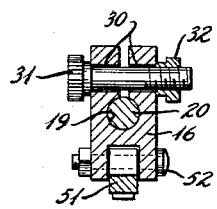
INVENTOR
J. H. CUNNINGHAM
BY
ATTORNEY United States Patent Office 3,214,839
Patented Nov. 2, 1965

3,214,839
GAUGE FOR MEASURING ALIGNMENT OR MIS-
ALIGNMENT AND AXIALLY SPACING OF
SHAFTS
John H. Cunningham, 708 Brookwood Road,
Baltimore, Md.
Filed Nov. 8, 1960, Ser. No. 68,100
4 Claims. (Cl. 33—148)

This invention relates to the alignment of rotary shafts and other objects and to equipment by which the alignment or misalignment is determined as well as the amount or degree of such misalignment in order that correction can be made.

The invention relates particularly to gauges or the like instruments by which discrepancies in alignment may be accurately determined and measured including the measurement of the angular and offset misalignments and the gap or space between the ends of the shafts.

Heretofore the measuring of offset and angular misalignment and the spacing apart of the ends of the shafts have been done with scales, straight edges, feeler gauges, and calipers and such operations have required skill and were time consuming. Also, these operations have been subject to human error, the results as determined by different individuals have been inconsistent, and considerable time and difficulty have been experienced in the inspection of the work after the correction of the difficulty.

It is an object of the invention to overcome the difficulties enumerated and to provide a device for determining the relative positions of shafts disposed in end to end relation including the total space or gap between the ends of the shafts and the angular and offset alignment or misalignment thereof as well as a device which can be used as a surface gauge in connection with parallel blocks and provided with a universally mounted mirror by which it can be observed from any angle.

Another object of the invention is to provide a relatively simple and inexpensive device for indicating the gap or the amount of space between the ends of shafts, both the angular and offset alignment or misalignment of such shafts, as well as a device which can be easily applied and operated in a minimum of time with maximum precision and minimum of effort and the use of which requires no special knowledge or training.

A still further object of the invention is to provide a device having unitary means actuatable from multiple positions for measuring the offset and angular alignment or misalignment of shafts as well as an indicator and the use of a universally mounted mirror in proximity thereto by means of which the indicator may be readily observed at all times and under all circumstances.

Other objects and advantages of the invention will be apparent from the following description taken in conjunction with the accompanying drawing wherein:

FIG. 1 is a side elevation illustrating two applications of the invention;

FIG. 2, a perspective of the shaft aligning device;

FIG. 3, a longitudinal section on the line 3—3 of FIG. 2;

FIG. 4, a transverse section on the line 4—4 of FIG. 2; and

FIG. 5, a transverse section on the line 5—5 of FIG. 3.

Briefly stated, the invention is a gauge having an observable dial with indications or graduations thereon and a pointer or indicator connected to a shaft which moves axially at right angles to the dial and when so moved causes the pointer or indicator to move relative to the graduations and with a universally mounted mirror by the arc of which movement of the indicator and the amount thereof can be readily observed. The shaft which moves axially at right angles to the dial is provided at one side with an opening for the reception therein of an attachment by which the gap between or the spacing of shafts can be measured by the indicator and dial.

With continued reference to the drawing, a pair of rotary shafts 10 and 11 are to be aligned, and these shafts have coupling elements 12 and 13 with smooth concentric surfaces 14 and 15 on abutting ends of such shafts.

In order to check the alignment of the coupling elements a shaft aligning device is provided having a generally hollow body 16 with a projection 17 at one and a bifurcated projection 18 at its opposite end. The body 16 has a cylindrical opening 19 for the reception of a mounting shaft 20 of a conventional gauge 21 having a spindle 22 which operates a needle or indicator 23 in cooperation with a dial 24.

An attachment 25 may be connected to the dial and such attachment is provided with an operating lever or extension 26 having a bulbous outer end 27 and such lever is connected to the spindle 22 to operate the indicator 23. If desired, a spindle extension 28 of any desired length may be attached to the lower end of the spindle 22.

The bifurcated projection 18 is provided with openings 30 in which a clamping screw 31 is received and held by a nut 32 to clamp the projection 18 onto the shaft 20. The outer end of the attachment 25 is adapted to support a pair of clamping members 35 and 36, each having an arcuate recess 37 at its lower end of a size to conform to the configuration of the attachment 25. The upper ends of the members 35 and 36 have concave recesses 38 to accommodate a ball 38'.

The members 35 and 36 are clamped together by a screw 39 which threadedly engages the member 36 and such screw has a shoulder 40 so that when the screw is tightened the shoulder 40 will bear against the clamp member 35 and firmly hold the members in contact with the attachment 25 at the lower end of the members and in contact with the ball 38' at the upper ends thereof. A shaft 41 extends through the ball 38 having a knob 42 at its lower end for rotation of such shaft. The upper end of the shaft 41 passes through a pair of semicircular members 43 having a recessed groove 44 in which a mirror 45 is received and retained. The free end of the shaft 41 has an enlargement 46 to prevent the members 43 from becoming detached therefrom.

The lower portion of the body 16 has a slot 50 which receives an arm 51 mounted on a pivot 52 connected to opposite sides of the body 16 and passing through a projection 53 on the arm 51. The rear end of the arm 51 has an opening 54 in which is mounted an adjusting screw 55 having a head 56 on one end for engagement with the arm 51 and the arm has screw threads 57 on its opposite end for engagement with a nut 58.

The screw 55 extends upwardly through the arm 51 and the body 16 and through an opening 59 in the top of the projection 17. A spring 60 is interposed between the arm 51 and the projection 17 to maintain the arm against the head 56 of the adjusting screw 55.

The opposite end of the arm 51 extends outwardly generally parallel to the attachment 25 and terminates approximately midway of the operating lever 26 thereof. The arm 51 has an enlarged portion 63 beneath the gauge 21 and such enlarged portion is provided with a slot 64 through which the spindle 22 projects. A finger or extension 66 having a lateral projection 67 on its outer end is mounted on the free end of the arm 51 by screws or other fastening means 68. The finger 66 has a transversely convex surface on one side and a concave surface on its opposite side providing a recess 69 located axially of the finger in the top surface thereof so that when the distance between the operating lever 26 and the finger 66 is decreased the lever 26 will fit within the arcuate recess 69.

In order to ascertain offset misalignment a block or fitting 73 is provided adjustably mounted by means of a bracket 74 having a slot 75 for the reception of a screw 76 with a shoulder 77. The screw 76 threadedly engages the block or fitting 73 and the shoulder 77 engages the bracket 74 to hold the block in fixed relation to the bracket. The bracket 74 is adapted to be mounted on either side of the enlarged portion 63 of the arm 51. In order to do this, the bracket 74 is provided with a lug 78 having a flange 79 adapted to overlap the enlarged portion 63 of the arm 51. The free end of the bracket 74 has an upwardly disposed lug 80 which threadedly receives a screw 81 which engages a recess 82 in the side of the enlarged portion 63, it being noted that a recess 82 is located on each side of the enlarged portion 63 so that the parts may be assembled for use by either the right or the left hand. A slot 83 is provided in the bracket 74 between the lugs 78 and 80 to allow the spindle 22 to project therethrough for free vertical movement of such spindle.

In operation angular misalignment is determined by measuring the space or gap between the opposed coupling members 12 and 13. This is accomplished by operating the nut 58 to adjust the spacing of or the distance between the operating lever 26 and the finger 66 so that they will fit in the gap or space between the coupling members. When the nut 58 has been operated to adjust the space between the operating lever 26 and the finger 66 with both the lever and the finger in contact with the gap forming members, further operation of the nut 58 will cause the lever 26 to operate the hand 23. The nut 58 is operated until the hand reaches zero or other predetermined position on the dial 24 whereupon the device is removed and reinserted in the gap approximately 180° from the original position. If the hand returns to the predetermined position, the angular alignment is exact. If the hand does not return to the predetermined position, the amount of misalignment is measured whether the gap is narrower or wider. If desired, the device then may be rotated 90° and a reading taken, and then rotated 180° to read the opposite side. The angular misalignment can then be calculated and one of the shafts adjusted to compensate for such misalignment.

In order to check the offset misalignment, the V-block 73 is firmly placed on one of the smooth concentric surfaces 14 or 15 (FIG. 1) in a position such that the spindle extension 28 will rest on the concentric surface of the opposed coupling element. The nut 58 is then operated to move the hand 23 to the predetermined position on the dial 24. The device is then rotated approximately 180° and the operation repeated and any misalignment of the coupling elements is read directly on the dial and one of the shafts may be adjusted to compensate for such misalignment.

It will be obvious to those skilled in the art that various changes may be made in the invention without departing from the spirit and scope thereof and that the invention is not limited by that which is set forth in the specification and shown in the drawing, but only as defined in the accompanying claims.

What is claimed is:

1. The combination in a visual indicator gauge of a pair of gauge members disposed generally at right angles to each other, one of said members being movable axially of said gauge to actuate said indicator gauge and the other of said members engageable with said one member to actuate said gauge, a body mounting said gauge, a lever pivoted relative to said body and extending across said one gauge member and generally parallel to said other gauge member, means for adjusting said lever to vary the spacing of its free end relative to said other gauge member and the relative position of the same with said one gauge member, an adjustable object engaging element carried by said lever adjacent said one gauge member whereby when such element is on the surface of an object and said one gauge member is in contact with the surface of a second object the relative alignment of the two will be visible on said indicator and when the end of said lever and said other gauge member are between spaced surfaces the relative spacing will be indicated, and means for adjusting said object engaging element relative to said one gauge member.

2. Apparatus for measuring the alignment and spacing between a pair of elements comprising a body, a gauge having a movable indicator removably mounted on said body, axially movable spindle means connected to said indicator for operating the same, a pivotally mounted operating lever connected at one end to said spindle means for selectively operating said indicator, the other end of said lever extending outwardly from said gauge, an arm pivotally connected intermediate its ends to said body, one end of said arm extending outwardly of said body in the same direction as said lever and terminating in spaced relation thereto, and selectively adjustable means connected to the other end of said arm for adjusting the space between the other end of said lever and said one end of said arm, whereby the spacing between said arm and said lever can be selectively varied before insertion between the pair of elements and thereafter varied to cause the arm and lever to engage the elements and move said indicator to a predetermined reading.

3. The structure of claim 2 including an adjustable object engaging member mounted on said arm comprising a bracket removably fixed to said arm, block means adjustably mounted on said bracket and means connecting said block means to said bracket in fixed adjusted position whereby said block means is movable into engagement with one of said pairs of elements and said spindle means will engage the other of said elements to determine the relative alignment of said elements.

4. The structure of claim 3 in which said bracket is reversibly mounted on said arm.

References Cited by the Examiner
UNITED STATES PATENTS

| | | | |
|---|---|---|---|
| 1,507,517 | 9/24 | Robles | 33—148 |
| 1,863,757 | 6/32 | McChesney | 33—148 X |
| 2,069,043 | 1/37 | Miller | 33—148 |
| 2,546,990 | 4/51 | Euverard et al. | 33—172 X |
| 2,755,557 | 7/56 | Witchger | 33—172 |
| 2,791,033 | 5/57 | Walters | 33—148 |
| 2,833,051 | 5/58 | Cunningham | 33—180 |

ISAAC LISANN, *Primary Examiner.*

ROBERT L. EVANS, *Examiner.*